Aug. 25, 1970     C. D. SKIRVIN ET AL     3,525,900
FREQUENCY CONTROLLED ENHANCEMENT OF LIGHT EMISSION
Filed March 4, 1965     2 Sheets-Sheet 1
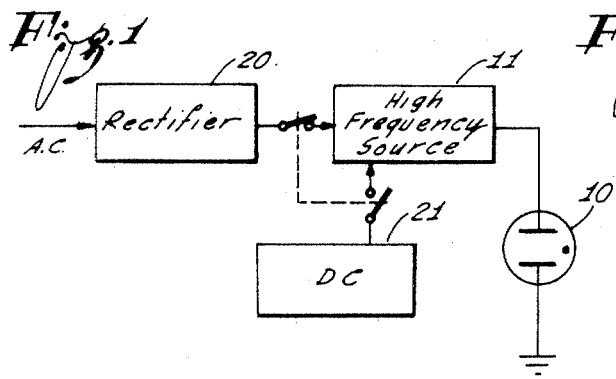
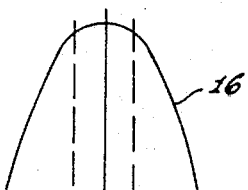
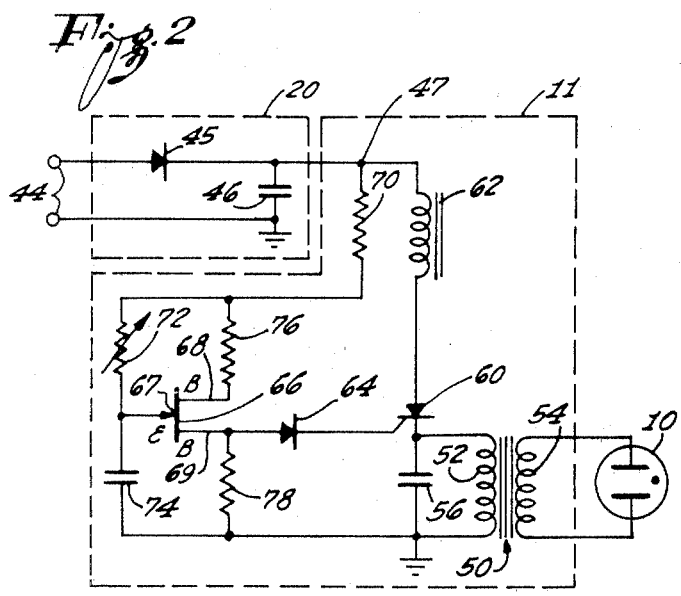
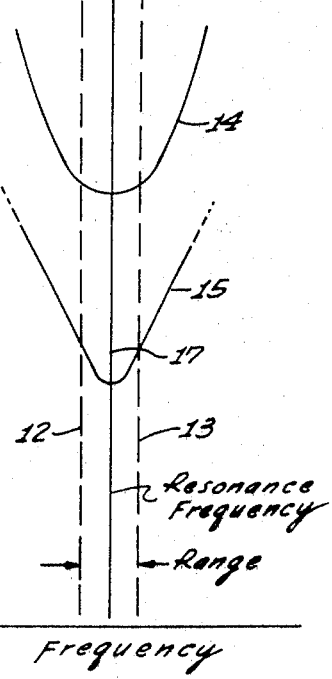
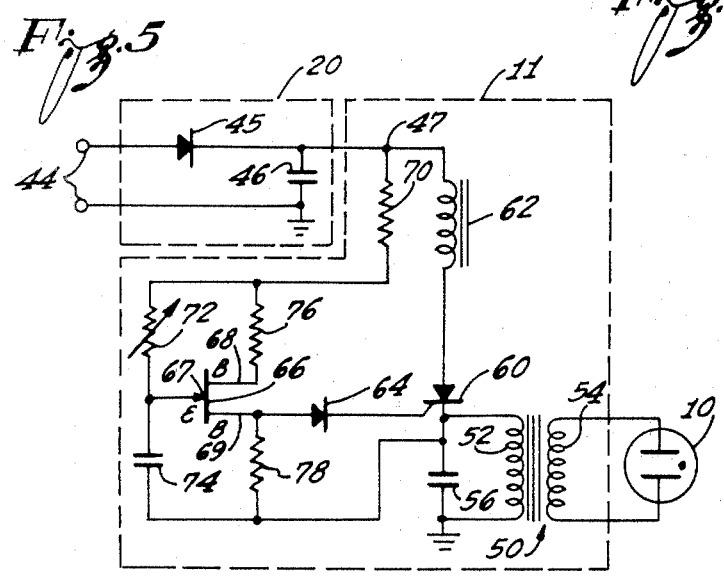
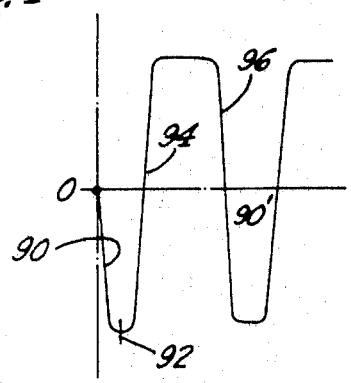
INVENTORS
Clifford D. Skirvin
Jerome Zonis
John H. Ketola
By Smyth, Roston & Pavitt
Attorney.

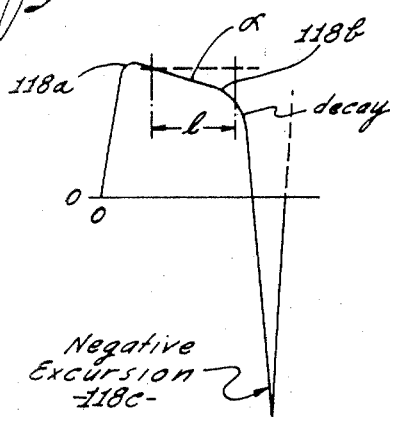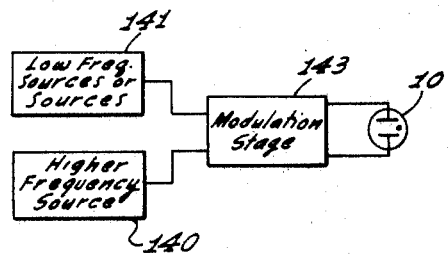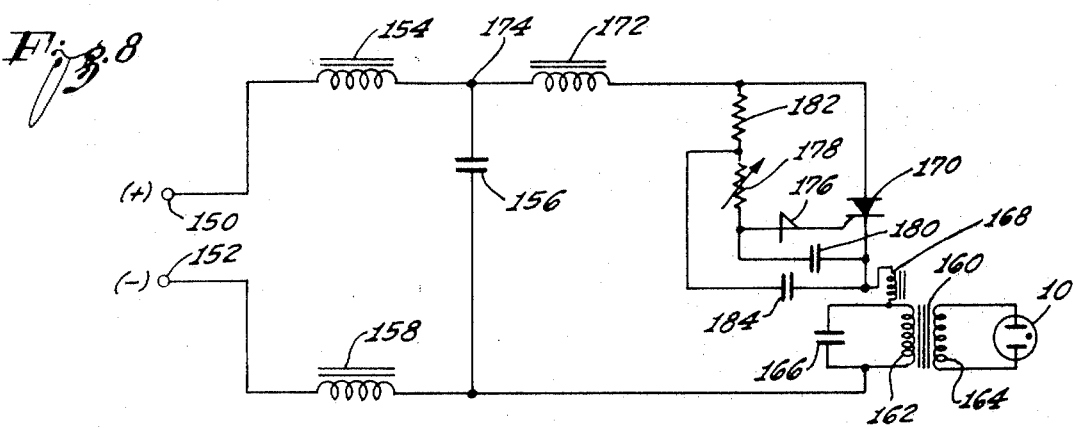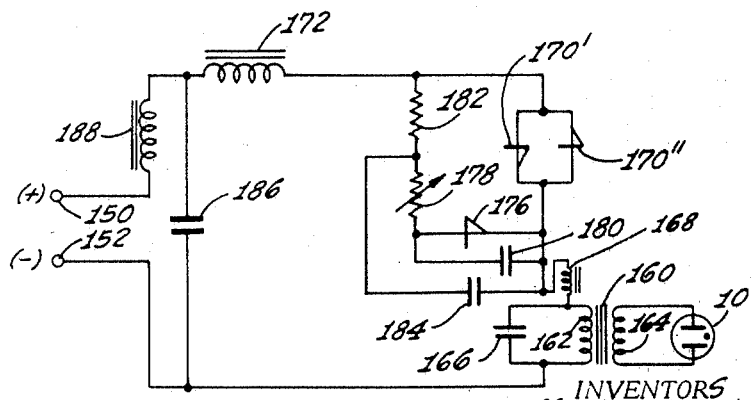

United States Patent Office 3,525,900
Patented Aug. 25, 1970

3,525,900
FREQUENCY CONTROLLED ENHANCEMENT OF LIGHT EMISSION
Clifford D. Skirvin, Pomona, Jerome Zonis, Ontario, and John H. Ketola, Pomona, Calif., assignors to Microdot, Inc., Pasadena, Calif., a corporation of California
Continuation-in-part of application Ser. No. 198,325, May 28, 1962. This application Mar. 4, 1965, Ser. No. 437,127
Int. Cl. H05b *41/26, 41/30*
U.S. Cl. 315—98                                17 Claims

ABSTRACT OF THE DISCLOSURE

This invention relates to a system for illuminating a luminescent tube at a high level with a minimum amount of energy for producing resonances of the gases in the tube. The system produces such illumination by introducing to the tube a signal having a fundamental frequency and a considerable number of harmonics where the fundamental frequency is at a relatively high value in the order of thousands of cycles per second and where the amplitudes of the harmonics are relatively great.

---

This is a continuation-in-part of application, Ser. No. 198,325 filed May 28, 1962 by us. This invention relates generally to the energization of gaseous conduction-type tubes, and more particularly concerns controlling the input frequencies, input waveshapes, radiation outputs, or intensities of gas tubes, in such manner as to substantially increase their operating efficiencies, service lives, simplicity of construction, and many other characteristics.

So-called cold-cathode, gas filled tubes have a cathode or emitter from which electrons are emitted for collection at the anode, so that ions move toward the emitter. Such tubes are generally filled with some inert gas or mixture of gases, such as neon, argon and zenon, at low pressure. When sufficient voltage is applied across the two main electrodes, the gas will become ionized and electron emission will occur at the cathode for maintaining the conduction. Cold-cathode tubes require appreciably more voltage to break down the gas and start conduction than is required to maintain conduction after it has been started, typical breakdown and operating voltages being 15,000 and 7,500 volts, respectively. The cathode-anode voltage drop during conduction depends upon the type of gas and pressure employed in the tube.

Since the voltage drop is practically independent of the magnitude of the current for normal operating frequencies such as 60 cycles, it is necessary to have an impedance connected in series with the anode circuit in order to control the magnitude of the anode current and limit the current to a safe value. In neon lighting applications, a flux shorting bar is typically utilized in a step-up voltage transformer connected between the 60-cycle, 120 volt AC source and the neon tube. Such transformers are bulky and expensive, and considerable wasteful heat loss occurs as a result of the use of the shorting bar.

Heretofore, gas tubes have exhibited a large drop in "Q" (light output in terms of lumens per watt) over the first few hours of operation. In fact, this decline in efficacy is so common that most gas tubes are rated for "initial" lumens after 100 hours burning. One significant factor in this tube decline is the presence of cesium oxide on the tungsten electrodes (for electron emission); in operation, the cesium oxide gets white hot, sputters, and blackens the tube. Moreover, when sufficient cesium oxide has sputtered off, the tube fails completely. Prior gas tubes have also had the disadvantages of needing a parallel ballast transformer and thermal switch apparatus to permit the tube to build up to the point of arcing and yet prevent short circuiting or overloading once sufficient heat has arisen within the tube.

In accordance with the principles of the present invention, gas-filled tubes may be made to perform efficiently at relatively low voltages and currents with little or no heat loss and yet with increased Q or output in terms of luminous efficacy (lumens per watt) by the use of an input or power supply signal of a specially-shaped waveform supplied at frequencies selected according to new and inventive principles. The input waveform is generated (in an oscillator circuit specially designed according to other features of the invention) to have a steep leading edge and high initial voltage, followed by a declining voltage, and terminating in a deep negative-going portion to lower as much as possible the energy levels of the normal orbits of the valence electrons of the luminescent being exited. As another feature of the invention, the above-described waveform is supplied at a basic frequency at which the applied voltage and also current pass through minimum levels while the tube radiation or light output passes through one or more coinciding maximum levels as the frequency is varied through the range. These power-minimum-light-output-maximum conditions occur at points in the supply frequency range (above the usual 60-cycle supply frequency yet well below the one megacycle and up range) where the gas in the tube develops resistance to current flow, where the basic supply frequency or some harmonic thereof is near one or more optimum output energy frequencies in the spectral distribution curve of one of the luminescents being excited, where the gas tube is in a series-resonant condition with its supply source, where the gas tube attenuation is lowered as to some harmonics of the basic frequency due to the requirements for waveguide behavior being met, and/or where the spectral distribution of the light produced is strong in the green-yellow area. For example, a commercially available neon tube which normally requires around 15,000 volts initially (the ionization potential of the gas) and then around 7,500 volts application during operation at 60-cycles per second frequency, drawing 60 milliamperes current at 450 watts, can be operated with greater resultant light output at around 650 volts applied at 80,000-cycles per second frequency, the tube drawing 5.5 milliamperes current at 3.6 watts. As a result, the life of the tube can be greatly extended because it requires far less power than is conveniently considered necessary, the tube remains cool, and performance of the tube in terms of light output is at the same time increased.

The phenomena occurring at higher frequency operation as described may be characterized as a "resonance" development within the free and captive electron structure of the tube gas, since the luminous output of the gas, which occurs as a result of electron displacement within the atomic structure, is a function of applied frequency and passes through maxima as the frequency changes. These maxima must, of course, be determined experimentally for various tubes.

The voltage waveform provided in each cycle by the systems constituting this invention initially has a sharply rising portion for initiating ionization of the gas in the luminescent tube, thereafter has a portion progressively decreasing in amplitude at a relatively shallow rate and then has a sharply falling portion to obtain a recombination of the ions of the gas into atoms so that a new ionization cycle can be initiated. The light in the tube is generated by the production of ions from the atoms of the gas and the reformation of the ions into the gas. The intensity of the light in the tube is enhanced because the tube acts as a wave guide resonant at a particular frequency and the system produces signals at this frequency for resonating the gas ions in the tube to facilitate the further production of ions. The system constituting this invention automatically adjusts the frequency of the fundamental and harmonics of the system to compensate for variations in the impedance of the tube by controlling the length and negative slope of the voltage portion of gradually decreasing amplitude. The higher harmonics present in the waveform have another important effect: the increase in lamp efficacy due to the supply of higher frequency power. For the effect of illuminating frequencies between $10^6$ and $10^8$ c.p.s., see U.S. Pat. No. 2,015,885, Dallenbach and "Oscillations in Ionized Gases" by Tonks and Langmuir, Physical Review, vol 33, 1929. These references, of course, relate only to behavior of gas tubes at frequencies above one million cycles per second and do not show or suggest the phenomena discussed in the instant invention, where the basic applied frequency is in the $10^3$–$10^5$ range.

As another feature of applicant's invention, it has been discovered that when the non-sinusoidal waveform referred to above is applied across the electrodes of a gas tube, the tube will perform noticeably better when one electrode is the "anode" (i.e., is coupled nearest the positive reference line of the circuit) than when the other electrode is. To determine which electrode of a given tube is the anode and which the cathode, the tube must be tested with a light meter in both of the alternative alignments. The result of the test, however, will invariably show a striking light/power-input difference between the two. However, the anode of the tube generally occurs at the end in which the tube is sealed after the gas has been introduced into the tube.

As another feature of applicants' invention, the amplitude of the lighting system input waveform discussed above can be decreased periodically (at frequencies up to several hundred cycles, a range hereinafter referred to as "low frequency") without causing a corresponding decrease in light output. This is a consequence of the persistence of the luminescent gas, whereby it continues to emit photons of light for a period of time after excitation is diminished. Thus, low frequency modulation of the envelope of gas tube excitation signals can conserve power and thereby make added contributions to the efficacy of the lighting systems herein disclosed.

Accordingly, among the major objects of this invention are the provision of means in combination with gas-filled tubes for driving the tubes at high frequencies characterized as described above, methods of so operating such tubes, and also means and methods for intermittently energizing tubes at such high frequencies as will be described. In addition, the invention contemplates driving tubes at characteristic high frequencies modulated by lower frequencies, and features several new circuits for deriving the power supply waveform.

These and other objects and features of the invention, as well as the details of illustrative embodiments, will be more fully understood from the following description of the drawings, in which:

FIG. 1 is a block diagram showing of a lighting system in which a high frequency source is coupled to supply an excitation signal to a gas-filled tube;

FIG. 2 is a schematic representation of an oscillator circuit which may be coupled to supply an excitation signal to a gas-filled tube;

FIG. 3 is a graph showing the characteristic optimization and near optimization of light output, voltage and current with changing frequency according to the principles of applicants' invention;

FIG. 4 is a graph in time-voltage coordinates of the gas tube supply waveform resulting from the circuit of FIG. 2;

FIG. 5 is a schematic diagram of an improved circuit according to certain features of the instant invention;

FIG. 6 is a graph in time-voltage coordinates of the gas tube supply waveform resulting from the circuit of FIG. 5;

FIG. 7 is a block diagram of a system for the modulation of high frequency excitation signals with a lower frequency to improve the ratio of input power to light output;

FIG. 8 is a schematic diagram of an improvement upon the circuit of FIG. 5; and

FIG. 9 is a schematic diagram of another improvement upon the circuit of FIGS. 5 and 8.

Referring first to FIG. 1, a gas-filled tube is indicated at 10 with its electrodes respectively grounded and coupled to a high frequency source 11. The tube 10 typically contains an illuminative gas such as neon, argon, xenon, crypton and helium, or mixtures thereof, and also may contain insertions of mercury, sodium and other substances, such tubes being known to those skilled in the art. In the practice of the instant invention and as one feature thereof, these prior art gas tubes may be improved in performance by testing to determine which electrode performs better in the positive and which in the negative circuit position and aligning the tube accordingly. As previously indicated, the end of the tube as finally sealed generally constitutes the anode of the tube.

The high frequency source 11 of FIG. 1 supplies alternating current to the tube 10 at such fundamental frequencies and/or with a waveform so rich in harmonics of the fundamental that the applied voltage, and also typically the current drawn by the tube 10, pass through minimum levels while the radiation output of the tube 10 passes through a maximum level as the fundamental frequency is increased or decreased over the range. The effect of this technique is illustrated in FIG. 3, with the vertical broken lines 12 and 13 defining a high frequency range within which the voltage and current curves 14 and 15 pass through minima, while the radiation intensity curve 16, as for example lumens output, passes through a maximum. It is clear from the diagram that curves 14, 15 and 16 reach optimum values or near optimum values at or very close to the same frequency, which may be considered the "resonance" frequency indicated by the vertical line 17, although it is contemplated that such optimum values may be somewhat offset from line 17 while still within the range defined by lines 12 and 13. Accordingly, the tube may be considered as operating under conditions such that the gas develops resistance to current passage which varies as a function of frequency applied. It will be noted at this point that the optimum values of applied voltage and current drawn are only a fraction of the voltage and current required to operate the tube at standard 60-cycle applied frequencies, as pointed out in the introduction. Different tube and electrode sizes and variation of gaseous components or conditions will affect the specific "resonance" frequency for any given tube. For example, the larger the electrodes or the lower the gas pressure, the less voltage is required to excite the gas.

Referring to FIG. 2, the oscillator circuit shown schematically therein may have as its input power supply 44 either an AC source or a DC source. If an AC source is used, a rectifier 20 as shown in FIG. 1 is necessary. The rectifier 20 could be composed of a series diode 45 and a groupnded capacitor 46. Beyond the rectofier 20 beginning at a power input point 47 comes the oscillator proper, as shown in FIG. 1 as a high frequency source 11. The oscillator 11 supplies excitation signals across the electrodes of the tube 10 through a transformer 50 having primary 52 and secondary 54. The secondary 54 of the transformer 50 is coupled to the electrodes of the tube 10. The primary 52 of the transformer 50 is grounded at its first end and has a capacitor 56 coupled in parallel across it to form a tank circuit which may be resonant at the fundamental frequency of the excitation waveform shown in FIG. 4. The second end of the primary 52 (i.e., the ungrounded terminal of the tank circuit 52–56) is coupled to the rectifier 20 through the series combination of a control member such as a silicon control rectifier (SCR) 60 and a coil 62. Control signals for the silicon control rectifier 60 are directed thereto through a diode 64 from one output electrode of a unijunction transistor 66, which has an output electrode 67 and output electrodes 68 and 69. Control signals are supplied to the input electrode 67 of the unijunction transistor 66 by a timing network comprising the series combination of a resistor 70, a variable resistor 72 and a capacitor 74 coupled between the input terminal 47 and ground. The input electrode of the unijunction 66 may be connected between the variable resistor 72 and the charging capacitor 74. In such case, when the unijunction 66 is "off" (i.e., non-conductive), the capacitor 74 will charge through the resistors 70 and 72. Naturally, the setting of the variable resistor 72 will determine the speed of charging or the time constant of the timing network 70–74. As the capacitor 74 charges, the voltage on the input electrode 67 of the unijunction 66 rises until a point is reached where the unijunction "fires" or switches to its "on" or conductive state.

Coupled to the output electrodes 68 and 69 of the unijunction transistor 66 are two resistors 76 and 78, the resistor 78 being coupled between the output electrode 69 and ground. When the unijunction 66 is non-conductive, the output electrode 69 is at ground potential. When the unijunction transistor 66 becomes conductive, voltage division occurs across the resistors 76 and 78, with little attenuation in the unijunction transistor itself; so that the voltage on the output electrode 69 rises to a positive value which the diode 64 conducts to the control electrode of the silicon controlled rectifier 60. Since the unijunction is thus pulsed on by a timing network which is independent of the tank circuit 52–56, the control signals to the SCR 60 do not need to be of the tank circuit resonant frequency. In fact, optimum performance of the circuit shown in FIG. 2 has been obtained when the signal shown in FIG. 4 has a fundamental frequency approximately four times greater than the resonant frequency of the tank circuit formed by the winding 52 and the capacitor 56. As previously described, the silicon controlled rectifier 60 is triggered to the conductive state in each cycle of the signal shown in FIG. 4.

According to the principles of applicants invention, the frequency of the tank 52–56 is initially adjusted (as on a manual basis by varying the value of the capacitor 56) as near as possible to the resonant frequency (17 of FIG. 3) of the type of gas tube 10 constituting the load. The waveform shown in FIG. 4 is produced as follows: when the SCR 60 is first switched "on" by a pulse through the diode 64, the circuit from the power supply point 47 through the coil 62 and the tank 52–56 to ground is closed and current begins to flow. The first effect of this current is to cause a back E.M.F. in the coil 62 so that the voltage at the second end of the primary 52 (the ungrounded end) drops as indicated in FIG. 4 at 90. After this voltage has dropped a certain amount, the control pulse from the unijunction transistor 66 ends because of the discharge of the capacitor 74 and the SCR 60 switches "off" as indicated in FIG. 4 at 92. Thereafter, the back E.M.F. resulting from the interruption in the current through the coil 62 causes the voltage to rise sharply, as indicated in FIG. 4 at 94. After the voltage of the waveform of FIG. 4 reaches a certain positive level, discharge of the capacitor 56 causes it to decline again towards the zero reference as indicated in FIG. 4 at 96. Thereafter, the switching "on" of the SCR 60 initiates another cycle as indicated in FIG. 4 at 90'.

FIG. 5 is a schematic of an improved circuit which, as another feature of applicants' invention, delivers a considerably improved waveform to the tube 10. The change in the circuit of FIG. 2 consists of coupling the capacitor 74 and the resistor 78 therein to the ungrounded end of the primary 52 rather than to the grounded end, causing the switch-on pulses from the unijunction transistor 66 to coincide more closely with the decay in the tank circuit 52–56.

FIG. 6 shows the wave-shape (i.e., time-voltage plot over one cycle) produced by the circuit of FIG. 5 and applied across the electrodes of the gas tube 10 according to one feature of applicants' invention. It begins with a high initial level 118a, followed by a decay portion 118b of variable length $l$ and variable angle of slope $\alpha$. At the end of the decay is a deep negative excursion 118c, from which the voltage later rises to form the leading edge of the next individual wave. The purpose of the applied waveform is to supply energy to the luminescent gas in the tube 10, whereby valence electrons of the individual atoms of the gas are excited out of their normal orbits into some "excited" orbit. When the electron later returns to its normal orbit, its excess energy is emitted as a quantum of radiation. Accordingly, the high initial level 118a forces a maximum of energy across the gas at the beginning of each cycle; then the decay 118b imposes an infinitude of harmonics (ranging up to hundreds of megacycles in frequency) upon the gas tube electrodes. At certain fundamental frequencies determined by tube diameter, contents and other characteristics, one or more of the higher harmonics in the applied wave-shape of FIG. 6 will traverse the tube in accordance with the well-known principles of waveguides, whereby the tube will offer greatly reduced attenuation to harmonics above a certain cut-off frequency. Moreover, as is usual with luminescents, the gas in the tube 10 exhibits various spectral characteristics and increased efficacy at certain very small wavelengths, so that variation of the fundamental frequency, by changing the $l$, and the $\alpha$ of the waveform of FIG. 6, will vary the applied harmonics until one appears that brightens the gas tube considerably, at a small expenditure of applied power, as shown in FIG. 3.

The negative slope of the portion $l$ and the variable length of this portion are advantageous for other reasons of some importance. For example, by providing the voltage peak 118a, the production of ions in the gas is obtained because of the high energy level produced in the gas. Once ionization has been initiated, the ionization is sustained and further ionization is produced at a reduced energy level. Because of this, the portion $l$ can be provided with a negative slope to sustain and produce ionizations without requiring an optimum energy level. This means the energy losses in the tube can be minimized.

The characteristics of the negative excursion 118c in the input voltage waveform of FIG. 6 also provide certain advantages. During the negative excursion, the ions produced in the previous half-cycle are recombined to form molecules such that light is emitted from such recombination as previously described. Furthermore, the excursion 118c is quite sharp and is steeper and greater in amplitude than the positive excursion 118a to insure that the energy level in the tube is reduced below the level where the production and maintenance of ions will be maintained. In this way, the ions produced in each cycle are recombined during the negative excursion so that a new cycle of ionization can be instituted in the next cycle without any holdover of ions from the previous cycle and so that a maximum transfer of energy in the formation of ions and the recombination of ions into molecules can be obtained. Furthermore, the negative excursion 118c is shorter in duration than the positive excursion since it allows an optimum time for ions to be produced in the portions 118a and 118b and since the level of light in the tube is dependent upon the number of ions produced and the subsequent reformation of these ions into molecules.

Actually, the waveshape shown in FIG. 6 has certain other advantages. For example, the deep excursion in the negative direction causes the rise in voltage from the negative trough of the negative excursion 118c to the peak of the positive excursion 118a to be considerably greater than would otherwise occur for only the positive excursion 118a. This, in turn, causes the increment of energy imparted to the electrons in the molecules to be quite great; so that a high quantum of energy is imparted to the electrons to orbit the electrons through paths considerably removed from the atoms or molecules of which the electrons form a part. This orbiting of the electrons through paths far removed from their atoms or molecules is instrumental in producing the orbiting of additional electrons so that ionization of a considerable number of atoms or molecules occur. In this way the amount of light emitted from the tube 10 is considerably enhanced.

The circuit of FIG. 5 produces the waveform of FIG. 6 in the following manner. Rectified and filtered voltage is applied to the charging capacitor 74 through the resistor 70 and variable resistor 72, and, as the voltage on the capacitor 74 rises, the emitter of the unijunction transistor 66, coupled to the capacitor 54, is caused to conduct. Current drawn through the resistor 78 then causes a voltage drop across it and allows the rectifier 64 to conduct gate current to the SCR 60, which then conducts (during the negative-going portion of the negative excursion 118c). The gate current frequency applied to the SCR 60 is controlled by the variable resistor 72. Accordingly, the output of the unijunction transistor modulates the basic tank circuit frequency applied to the gas tube. The choke 62 supplies the negative excursion 118c of the waveform of FIG. 6 because of the induced voltage thereon at the time the SCR 60 is first turned "on," while the collapse of the tank coil 52 gives the waveform a steep, harmonic-rich leading edge and the value of the tank capacitor 56 determines the shape of the decay curve 118b, both its length l and angle α.

The circuit shown in FIG. 5 has certain additional advantages since the length l and the slope α of the portion 118b in FIG. 6 become automatically adjusted in accordance with variations in the characteristics of the tube 10. For example, the impedance of the tube 10 may vary as the tube ages. The circuit shown in FIG. 5 automatically varies the length l and the slope a of the portion 118b to compensate for changes in the impedance of the tube 10. The circuit also compensates for variations in the impedance characteristics of different tubes 10.

FIG. 7 illustrates in block diagram form a system for supplying power to a gas tube 10 with increased lighting efficacy and a consequent economy of power. Signals from a high frequency source 140, such as the circuit of FIG. 5 supplying a waveform of the sort illustrated in FIG. 6, are modulated from a low frequency source 141 in a modulation stage of 143, which may be a conventional adder circuit. The effect of the system of FIG. 7 is to periodically lower the amplitude of the excitation waveform, whether it be the preferred waveform of FIG. 6 or some other type, without causing a corresponding decrease in the light output, because of the persistence of the gas. This means that in every cycle of the low frequency modulation there is a great saving in power over what would have been expended had the excitation waveform continued at its original amplitude.

FIG. 8 is a schematic diagram of an improved circuit of the sort set forth in FIGS. 2 and 5 wherein the unijunction transistor 66 of those circuits is replaced by switching element which is advantageous in some ways, and the supporting circuitry of the timing circuit is rearranged accordingly. The circuit of FIG. 8 has positive and negative reference terminals 150 and 152, respectively. A coil 154 and capacitor 156 are coupled to the positive reference terminal 150 in order to provide filtering of the AC power supply signal. A current-limiting choke 158 is coupled to the negative power supply in order to dampen any wide swings in current running through the circuit. As in the above-described circuits, a transformer 160 having primary 162 and secondary 164 has its secondary coupled across the electrodes of the gas tube 10 and its primary 162 coupled with a capacitor 166 to form a resonant tank. A first end of the tank 162–166 is coupled through the choke 158 to the negative power supply 152. A second end of the tank is coupled through a choke 168 to the series combination of a silicon control rectifier (SCR) 170 and an inductor 172 to the point 174 at which power is fed into the oscillator circuit proper.

In accordance with a feature of the instant invention, a three-layer or four-layer ("trigger") diode 176 has its output electrode coupled to the control electrode of the SCR 170. This diode is generally designated as a "Shockley" diode in honor of its originator. The input electrode of the diode 176 is coupled between a variable resistor 178 and a charging capacitor 180 which together with a fixed resistor 182 constitute the timing circuit of the oscillator of FIG. 8. A smoothing capacitor 184 is coupled from a point between the resistors 178 and 182 to the output electrode of the SCR 170. The timing circuit 178–182 is coupled between the input and output electrodes of the SCR 170 rather than connecting with the power input point 174 as was done in the circuits of FIGS. 2 and 5.

The improvements in the circuit of FIG. 8 come about in the following manner: The trigger diode 176 when in its conductive state conducts current in both directions and passes both positive and negative voltages of large amplitude, up to 300–400 volts. The unijunction transistor 66, on the other hand, could pass only positive voltages when it was "on," and then only positive voltages of limited amplitude: say 20–30 volts. Moreover, a unijunction transistor requires a 20-volt (more or less) switch-on signal, while a trigger can be switched with signals down to two volts. Voltages above this range are blocked by the unijunction transistor; and if this blocking effect is overpowered, the unijunction transistor would soon be destroyed by the "punch-through" effect characteristic of most overloaded semiconductors. Thus, the trigger 176 has as a first advantage that it can pass higher positive switch-on pulses to the SCR 170 and can also pass low voltage switch-on pulses very near the SCR threshold voltage.

Secondly, the trigger 176 can speed the turn-off time of the SCR 170 by passing negative voltages to its control electrodes, thus forcing faster recombination of the charge conductors (semiconductor holes or positive charges). Where the turn-off of a SCR is normally 10–15 microseconds, a strong negative signal from the trigger 176 can reduce turn-off time to 4 microseconds. It is worth noting that the trigger 176 can have a different firing voltage in each direction, so that it could turn "on" the SCR 170 at +12 volts and turn it "off" again at −30 volts, or whatever other values seem most desirable. The faster the SCR is turned "off," of course, the less will be its heating and power dissipation.

The removal of the "punch-through" danger by replacing the unijunction transistor 66 with the trigger 176 makes it possible to synchronize the firing signals to the SCR 170 with the frequency of the tank 162–166. Thus, the timing of the SCR 170 will automatically follow the changes in tank frequency due to tube aging, input power change, or the like. This compensation occurs because the signal across the capacitor 180 has added to it the signal across the tank 162–166 and it is the summation of these two signals that switches the trigger 176, in both its positive and negative modes. Moreover, the switch-off of the SCR 170 is speeded up by the deep negative control pulse passed from the coil 172 through the resistors 182 and 178. Such large voltage swings, incidentally, would soon destroy a unijunction transistor.

The inductor 168 has served to minimize disturbances due to varying power supply input resistance, a major cause of circuit decommutation in early testing thereof.

A circuit according to the schematic of FIG. 8 was built and operated using the following components.

Power supply:
   150–152 _____ 28 volts DC of high ripple content
Active elements:
   170 _____ 1304–2 SCR (Motorola)
   176 _____ 3 EX–016 (Clevite)

Resistors
178 ---------- 50K
182 ---------- 3.3K

Capacitors (microfarads):
166 ---------- 2.0
180 ---------- .022
184 ---------- .015

Inductors (millihenries):
154 ---------------------------------- 15
158 ---------------------------------- 25
168 ---------------------------- $50 \times 10^{-3}$
172 (32 turns #20 EC on ¼" x ¼" M6-14 mil lamination).

In the circuit of FIG. 9, other inventive improvements appear in the replacement of the SCR 170 of FIG. 8 with two trigger diodes 170′ and 170″ and in the use of a capacitor 186 and inductor 188 at the input to the circuit. The principal advantage of the parallel triggers 170′ and 170″ lies in their one-microsecond switching times, since the switching time of the SCR 170 of FIG. 8 cannot be reduced below four microseconds, even by the deepest possible negative turnoff signals through the trigger 176. The large capacitor 186 vastly improves circuit performance by its smoothing effect on the rough, variable DC input.

A circuit according to the schematic of FIG. 9 was built and operated using the following components:

Power supply:
150-152 ---------------------- 50 volts DC
Active elements:
170′ and 170″ ---------------- 3E50-5 (Clevite)
176 -------------------------- 3E30-1 (Clevite)
Resistors:
178 -------------------------------- 50K
182 -------------------------------- 4.7K
Capacitors (microfarads):
166 -------------------------------- 1.0
180 -------------------------------- .033
184 -------------------------------- .02
186 -------------------------------- $250 \times 10^3$
Inductors:
168—50 microhenries
188—2.0 millihenries
172—16 turns #20 wire EC on ¼" x ¼" M6-14 mil laminations.

It is also contemplated that other or additional modulating frequencies may be as effective or more effective at much higher than basic frequencies, such as the 3rd, 7th, 11th, etc. harmonic frequencies from the basic, which are produced by the circuit of FIG. 5 and appear as the waveform of FIG. 6. In one lighting system according to the instant invention, standard commercial 1½ inch diameter fluorescent tubes (4 foot or 8 foot in length) gave peak performance at fundamental frequencies of 11.5 kilocycles (kc.), 23 kc., and 46 kc., using sine waves, spike waves, and (for best output) the waveform of FIG. 6. In the above lighting system, the 23 kc. frequency gave the best tube efficiency. It has been found that gas-tube lighting according to the instant invention can be practiced with electrodes having only one contact and electrodes in only one end of the tube, and indeed with tubes considered "burned out."

Gas tubes in lighting systems according to the instant invention may be of far simpler construction than has heretofore been possible: unbalanced, "cold cathode" (i.e., not using thermionic emission of electrons to supply electrons to the luminescent gas), and with electrodes of any conducting substance, preferably cup-shaped for greatest conducting surface. In fact, only one electrode need be used. The circuit for the power supply within the tube will then be effective from the electrode to ground through the tube walls. Moreover, tubes powered as herein described do not need neon for low temperature starting and can use a variety of non-inert gases as luminants, such as $H_2$ or $NH_3$. $NH_3$ requires a 41 kc. fundamental frequency, but once energized will light for approximately 20 minutes without any applied power at all.

Applicants wish to emphasize that the fundamental frequency selection principle disclosed above results in some increase in gas tube and even vapor tube efficacy (that is to say: more lumens of light output per watt of applied power) regardless of the waveshape applied: sine wave, spike wave, square wave or whatever. The use of a waveform that has sufficient harmonics to "hunt" for frequencies of waveguide, series-resonant, or high-luminescent properties of the lighting system is another feature of the invention and is especially important because the exact frequencies of these beneficial conditions are both initially unknown and subsequently variable due to tube warmup and aging. The negative excursion 118c is another feature of the instant invention; for it alone establishes a much lower energy level for the "normal orbits" of the valence electrons of the luminescent gas so that the same applied power can excite each electron farther and can excite more electrons than would the same waveform starting only from the zero reference.

In addition to these broad gas tube excitation principles, the specific circuitry for performing the excitation is new and inventive and is within the scope of the instant application: the circuit of FIG. 2, giving the harmonic-rich excitation waveform of FIG. 4; and the circuits of FIGS. 5, 8 and 9 which add the sharp negative excursion 118c of FIG. 6 as well as increased oscillator operating efficiency.

Other features of applicants' invention are embodied in the principle and circuitry of FIG. 7, whereby power is conserved through the low frequency modulation of the excitation waveform. This low frequency excitation not only adds even more harmonic distortion beyond that applied by the waveforms of FIGS. 4 or 6, but also takes advantage of the persistence characteristic of most luminescents whereby light emission will remain undiminished for a short period after excitation power is reduced.

While only a limited number of embodiments have been disclosed herein, it will be readily apparent to persons skilled in the art that numerous changes and modifications may be made without departing from the spirit of the invention. Accordingly, the foregoing disclosure is for illustrative purposes only and does not limit the invention which is defined only by the claims that follow.

What is claimed is:

1. An electrical lighting system, including a tube having a sealed envelope and having at least a pair of electrodes for conducting an input electrical signal in the sealed envelope and having in the sealed envelope molecules of a luminescent gas with characteristics of becoming ionized and of obtaining an emission of light upon becoming ionized, the tube and the gas in the tube having characteristics to provide resonances in the tube at particular frequencies constituting harmonics of one another, first circuit means electrically coupled to the electrodes in the tube to obtain the introduction to the electrodes of a voltage having an asymmetrical waveform and having a first portion of a first polarity and a second portion of a second polarity opposite to the first polarity with the first portion of the first polarity having a greater duration than the second portion of the second polarity and with the amplitude of the second portion exceeding the amplitude of the first portion, and second circuit means operatively coupled to said first circuit means for obtaining a decrease in the amplitude of the positive portion of said asymmetrical waveform at a relatively low rate to maintain the light output of the tube substantially undiminished by the persistence of the luminescent gas until the amplitude of said asymmetrical waveform is returned to its maximum level.

2. In combination, a tube having a sealed envelope and having at least a pair of electrodes in the sealed envelope and having in the sealed envelope molecules of a gas with characteristics of becoming ionized and of obtaining an emission of light upon becoming ionized, the tube and the gas in the tube having characteristics to provide resonances in the tube at particular frequencies constituting harmonics of one another, and circuit means electrically coupled to the electrodes in the tube to introduce to the electrodes a voltage having an asymmetrical waveform and having a first portion of a first polarity and a second portion of a second polarity opposite to the first polarity with the first portion of the first polarity having a greater duration than the second portion of the second polarity and with the amplitude of the second portion exceeding the amplitude of the first portion.

3. The combination set forth in claim 2 wherein the circuit means is constructed to produce a voltage with the first portion having a spike at its leading edge and having a negative slope after the production of the spike.

4. In combination for use with a tube having a sealed envelope and having at least a pair of electrodes disposed within the sealed envelope and having gas disposed within the sealed envelope with characteristics of becoming ionized and of providing resonant characteristics at frequencies constituting harmonics of one another and having an impedance depednent upon the ioization characteristics of the tube, first means for obtaining the production of a first voltage pulse with sharply negative characteristics and with a particular amplitude for reforming the ions into molecules of the gas, second means operatively coupled to the first means and to the electrodes of the tube for obtaining the production of a second voltage pulse immediately after the formation of the first voltage pulse, with sharply positive characteristics and with an amplitude less than the particular amplitude, to produce ions from the molecules of the gas and to institute the resonances in the tube, and third means responsive to the formation of the second voltage pulse for producing a voltage portion of positive polarity and with a negative slope and a duration dependent upon the impedance in the tube.

5. The combination set forth in claim 4 wherein the second and third means are operative to provide the positive pulse and the voltage portion of positive polarity with a duration greater than the duration of the first pulse of negative polarity.

6. An electrical lighting system, including: a tube having a sealed envelope and having at least a pair of electrodes for conducting an input electrical signal in the sealed envelope and having in the sealed envelope molecules of a luminescent gas with characteristics of becoming ionized and of obtaining an emission of light upon becoming ionized, the tube and the gas in the tube having characteristics to provide resonances in the tube at particular frequencies constituting harmonics of one another, and circuit means electrically coupled to the electrodes in the tube to introduce to the electrodes a voltage having an asymmetrical waveform and having a first portion of a first polarity and a second portion of a second polarity opposite to the first polarity with the first portion of the first polarity having a greater duration than the second portion of the second polarity and with the amplitude of the second portion exceeding the amplitude of the first portion, said circuit means being further constructed to supply a minimum power and to provide a maximum light output from the tube at the fundamental frequency of the asymmetrical waveform.

7. In combination for energizing a luminescent lamp, first means for providing a direct voltage,
second means operatively coupled to the first means for providing a voltage of progressively increasing amplitude from a reference level,
a control member having operative and inoperative states and normally disposed in the inoperative state and responsive to a particular voltage to become triggered to the operative state,
third means operatively coupled to the control member for triggering the control member to the operative state upon the occurrence of the particular voltage in the second means to introduce a negative voltage to the lamp and for returning the voltage in the second means to the reference level to initiate a new cycle of progressively increasing the amplitude of the voltage in the second means and to return the control member to the inoperative state,
fourth means connected to the control member and responsive to the return of the control member to the inoperative state for obtaining the introduction of a sharply rising voltage to the lamp, and
means coupled to the lamp and to the fourth means for providing for a gradual decay of the voltage introduced to the lamp.

8. The combination set forth in claim 7 wherein the third means includes switching means having conductive and nonconductive states of operation and wherein the switching means is normally in the nonconductive state and is responsive to the particular voltage from the second means to become actuated to the conductive state and wherein the switching means is connected to the control member and the second means to introduce the particular voltage to the control member for triggering the control member to the operative state upon the actuation of the switching means to the conductive state.

9. The combination set forth in claim 7 wherein the second means include a resistor and a capacitor in series for obtaining a progressive charge of the capacitor and wherein the third means include switching means having conductive and nonconductive states of operation and wherein the switching means is normally in the noncoductive state and is responsive to a particular charge across the capacitor to become actuated to the conductive state for a discharge of the capacitor through the switching means and wherein the switching means is connected to the control member and the capacitor to introduce the particular charge to the control member for triggering the control member to the operative state upon the actuation of the switching means to the conductive state and for maintaining the control member in the conductive state during the discharge of the capacitor through the switching means.

10. The combination set forth in claim 7 wherein the fourth means includes at least an inductively reactive member.

11. The combination set forth in claim 7 wherein the third means includes an inductively reactive member and a capacitively reactive member and wherein the inductively reactive member and the capacitively reactive member are connected to each other.

12. Apparatus for supplying an AC input electrical excitation signal to a light production lamp of the luminescent type having an envelope with a luminescent gas which has atoms with valence electrons, including:
means for applying to the lamp at the beginning of each AC signal a voltage portion rapidly rising to a high initial voltage to force maximum excitation energy upon the valence electrons of the atoms comprising the luminescent gas,
means for subsequently applying to the lamp a voltage portion of slowly decreasing amplitude for supplying numerous harmonics of the basic frequency of the waveform following the high initial voltage, and
means for subsequently applying to the lamp in each cycle a deep negative-going voltage portion for lowering the relative level of the unexcited energy of the valence electron orbits of the atoms comprising the luminescent gas and causing the valence electrons to return to their unexcited orbits and to thereby emit a maximum number of light photons.

13. A circuit for supplying an input electrical excitation signal to a luminescent lamp having a hermetically sealed outer envelope with a luminescent gas inside the outer envelope and with the luminescent gas having atoms with valence electrons, including:
  means including an inductively reactive element for producing a voltage portion rising sharply to a high initial voltage to force maximum excitation energy upon the valence electrons of the atoms in the luminescent gas,
  means for producing a second voltage portion gradually declining from the high voltage portion to control the production of harmonics of the basic frequency of the waveform following the high initial voltage, and
  means including a capacitor coupled electrically to the inductively reactive element for obtaining the production of a third voltage portion falling sharply from the second portion to obtain a return of the valence electrons to their unexcited state and thereby obtain the emission of an optimum number of light photons.

14. In combination for supplying an input electrical excitation signal to a light production lamp of the luminescent type having a hermetically sealed outer envelope, luminescent gas inside the outer envelope with properties of becoming ionized, and at least one electrode mounted on the outer envelope for conducting the input electrical excitation signal to the luminescent gas, including:
  a transformer having primary and secondary, the secondary of the transformer being coupled to the electrode on the outer envelope of the tube,
  a source of direct voltage,
  triggering means connected to the source of direct voltage for providing a voltage of progressively increasing amplitude to a particular value from a reference value and for thereafter providing a return of the voltage to the reference value for thereafter initiating a new cycle of progressively increasing the amplitude of the voltage,
  a shock-excited resonant circuit comprising the primary of the transformer and a capacitor,
  a control member having conductive and nonconductive states and normally operative in the nonconductive state,
  an inductor connected in a circuit with the source of direct voltage, the tank circuit and the control member for introducing a voltage to ionize the gas in the tube upon a triggering of the control member to the conductive state, and
  switching means having first and second states of operation and normally operative in the first state and coupled between the triggering means and the control member and responsive to the particular voltage from the triggering means to become operative in the second state and produce the conductive state in the control member.

15. The combination set forth in claim 14 wherein the capacitor and the primary of the transformer are connected in parallel and wherein the control member constitutes a silicon control rectifier.

16. An electrical lighting system, including:
  a tube having a sealed outer envelope and having at least one electrode for conducting an input electrical signal and having luminescent gas in the tube with characteristics of becoming ionized and of obtaining an emission of light upon becoming ionized, the tube and the gas in the tube having characteristics to provide resonances of the ionized gas in the tube at particular frequencies constituting harmonics of one another,
  a transformer having a primary and a secondary,
  a capacitor connected to the primary of the transformer to provide a resonant circuit at substantially one of the resonant frequencies,
  the secondary of the transformer being coupled to the electrode of the tube,
  a power supply,
  the series combination of an inductor and a silicon control rectifier having first and second electrodes and a control electrode, the first and second electrodes of the silicon control rectifier being coupled between the power supply and the primary of the transformer to obtain the introduction to the tube of a voltage for ionizing the gas in the tube upon the energizing of the silicon control rectifier,
  switching means having operative and inoperative states and normally in the inoperative state, the switching means being connected to the control electrode of the silicon control rectifier for obtaining an energizing of the silicon control rectifier in the operative state, and
  circuit means coupled to the power supply and the switching means for supplying periodic control signals to the switching means to periodically provide operative state in the switching means.

17. The system set forth in claim 16 wherein the switching means constitutes a semiconductor trigger and the power supply constitutes a source of direct voltage.

References Cited

UNITED STATES PATENTS

| | | | |
|---|---|---|---|
| 1,671,109 | 5/1928 | George | 315—246 X |
| 1,996,359 | 4/1935 | Whitaker | 315—174 |
| 2,015,885 | 10/1935 | Dallenbach | 315—246 X |
| 2,983,846 | 5/1951 | Roesel et al. | 315—205 |
| 3,092,754 | 6/1963 | Fales | 315—205 X |
| 3,308,342 | 3/1967 | Coradeschi | 315—246 X |
| 2,538,062 | 1/1951 | Touvet | 250—199 |
| 2,745,311 | 5/1956 | Touvet | 250—199 |
| 2,923,856 | 2/1960 | Greene et al. | 315—205 X |

JAMES W. LAWRENCE, Primary Examiner

E. R. LaROCHE, Assistant Examiner

U.S. Cl. X.R.

315—105, 167, 246; 328—15